US010334978B1

(12) United States Patent
Pogosian

(10) Patent No.: US 10,334,978 B1
(45) Date of Patent: Jul. 2, 2019

(54) CUTTING TOOL WITH CURVED BLADE

(71) Applicant: Yelena V. Pogosian, Aurora, CO (US)

(72) Inventor: Yelena V. Pogosian, Aurora, CO (US)

(*) Notice: Subject to any disclaimer, the term of this patent is extended or adjusted under 35 U.S.C. 154(b) by 0 days.

(21) Appl. No.: 15/273,175

(22) Filed: Sep. 22, 2016

Related U.S. Application Data

(60) Provisional application No. 62/221,688, filed on Sep. 22, 2015.

(51) Int. Cl.
A47J 25/00 (2006.01)
A47J 17/02 (2006.01)
B25G 1/10 (2006.01)

(52) U.S. Cl.
CPC ............. *A47J 17/02* (2013.01); *B25G 1/102* (2013.01)

(58) Field of Classification Search
CPC ................................ A47J 17/02; B25G 1/102
USPC .................................................. 30/113.1, 298
See application file for complete search history.

(56) References Cited

U.S. PATENT DOCUMENTS

| 86,491 A | 2/1869 | House | |
|---|---|---|---|
| 2,031,191 A * | 2/1936 | Swedeland | A47J 17/02 30/279.6 |
| 2,188,362 A | 1/1940 | Krilow | |
| 2,583,577 A * | 1/1952 | Kingsbury | A47J 25/00 30/113.1 |
| 2,990,615 A | 4/1961 | Ohler | |
| 4,596,073 A | 7/1986 | Ewald | |
| 5,056,223 A * | 10/1991 | Buck | A47J 25/00 30/113.1 |
| 5,852,875 A * | 12/1998 | Dolah | A47J 25/00 15/22.1 |
| 6,769,186 B1 * | 8/2004 | Sakhleh | A47J 25/00 248/37.3 |
| D699,069 S * | 2/2014 | Emrick | A47J 25/00 D7/395 |
| 2004/0200079 A1 * | 10/2004 | Stoughton | A47J 25/00 30/514 |
| 2010/0263212 A1 * | 10/2010 | Settele | A47J 25/00 30/113.1 |
| 2011/0138630 A1 | 6/2011 | Tweg | |

* cited by examiner

*Primary Examiner* — Omar Flores Sanchez
(74) *Attorney, Agent, or Firm* — Cramer Patent & Design, PLLC; Aaron R. Cramer

(57) ABSTRACT

A cutting tool is provided having a cupped, double-edged blade and a handle. The knife blade is configured to be generally "C"-shaped in cross-section, curving upwardly on opposing longitudinal sides from a central portion. A longitudinal edge of the curved blade may have a serrated cutting edge. A protective handle is disposed at a rear of the blade.

4 Claims, 3 Drawing Sheets

CUTTING TOOL WITH CURVED BLADE

RELATED APPLICATIONS

The present invention is a Continuation and claims the benefit of U.S. Provisional Application No. 62/221,688, filed on Sep. 22, 2015, the entire disclosures of which are incorporated herein by reference.

FIELD OF THE INVENTION

The present invention relates generally to a cutting tool having a double-edged blade and a handle

BACKGROUND OF THE INVENTION

Cooks, chefs and others who prepare food are familiar with the time and effort it takes to peel and prepare various types of fruits and vegetables. Many have tried to eliminate this monotonous task by manufacturing complicated machinery that performs peeling operations automatically. While such contraptions may work, they operate only on a specific type of fruit or vegetable and the results often leave remnants which must be removed by hand anyways. Many have found that the simple knife is the quickest and most effective means of peeling such food. However, different knives are still needed, one (1) for cutting and peeling, one (1) for coring or plunge cutting, and yet another with scalloped edges to produce zig-zag patterns. This means that one has to pick up and put down multiple knives, often just seconds apart, just to prepare one (1) fruit or vegetable. Such inefficiency is not only time wasting, but frustrating as well, especially in the rapid paced environment of a restaurant or cafeteria. Accordingly, there exists a need for a means by which a different types of cutting operations on fruits and vegetables can be performed with only one (1) knife. The development of the cutting tool fulfills this need.

SUMMARY OF THE INVENTION

The device comprises a cutting tool which itself comprises a handle which has a first end and a second end, a blade which projects outward from the handle second end while also having an inner and outer face, a proximate and distal end, a first and second edge and an arcuate cross-section and a guard which is located on the handle second end and adjacent to the blade. In a separate embodiment, the handle and blade comprise of a coextensive and unitary material of construction.

The handle may be generally cylindrical and may also have a grip. The handle may also comprise a hemispherical butt at the handle first end. The blade may also comprise a taper between the inner face and the outer face of the first edge which terminates into a sharp edge. This taper may also be between the inner face and the outer face of the second edge and/or the distal end. In both circumstances the tape terminates in a sharp edge. The first and second edge may each individually further comprise a series of serrations. The guard may also have a diameter with exceeds the diameter of the handle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 tool
- 20 blade
- 25 inner face
- 30 outer face
- 35 first edge
- 40 second edge
- 45 distal edge
- 50 serration
- 70 handle
- 75 grip
- 80 butt
- 85 guard

DETAILED DESCRIPTION OF THE PREFERRED EMBODIMENT

The present invention describes a cutting tool with a curved blade (herein referred to as the "tool") 10, which provides a means to remove a core, including at least one (1) pit, and any associated encasing tissue, from certain fruits, such as an apple, a pear, or the like, without further sectioning that fruit.

Figure 1:
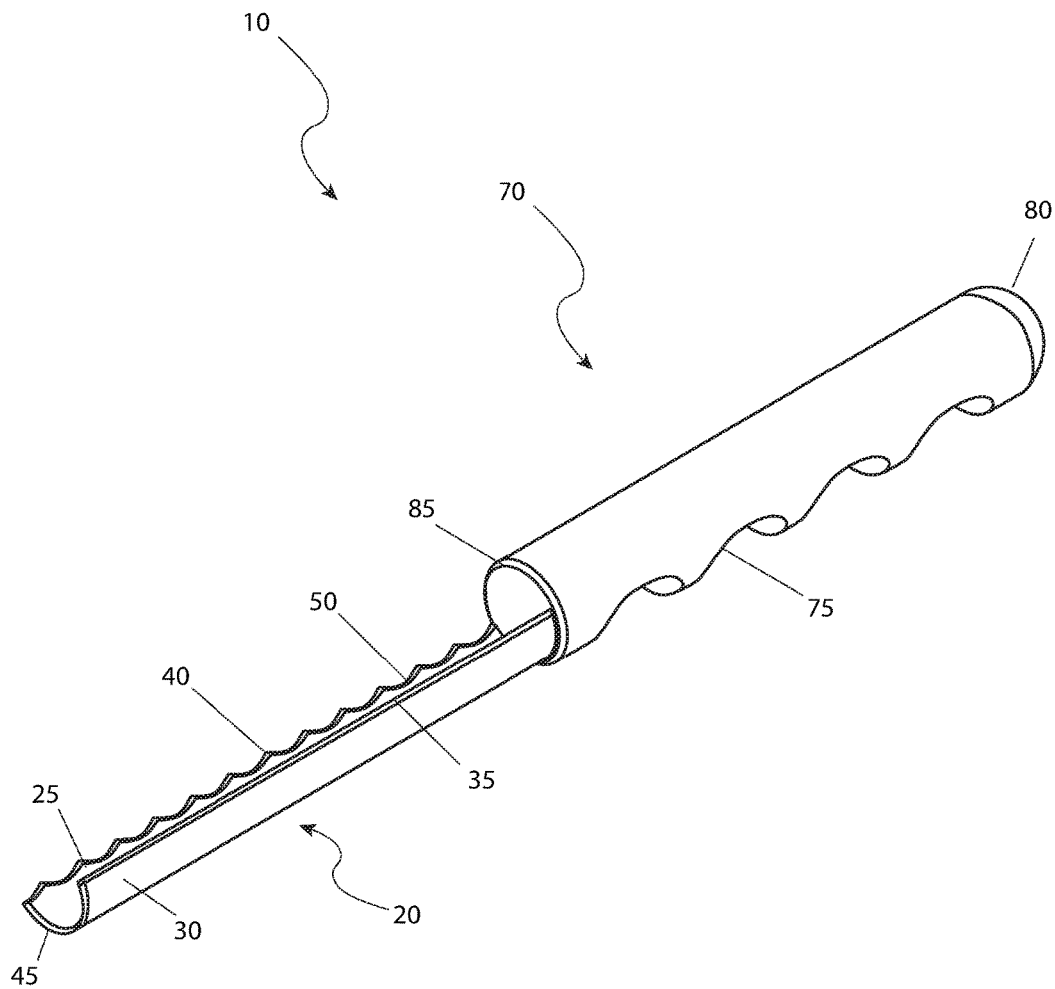
FIG. 1 is a perspective view of a cutting tool with a curved blade 10 in accordance with the preferred embodiment of the present invention; and, FIG. 2 is an isolated view of serrations 40 along a second edge 30 of a blade 20 of the tool 10 in accordance with the preferred embodiment of the present invention.
Figure 2:
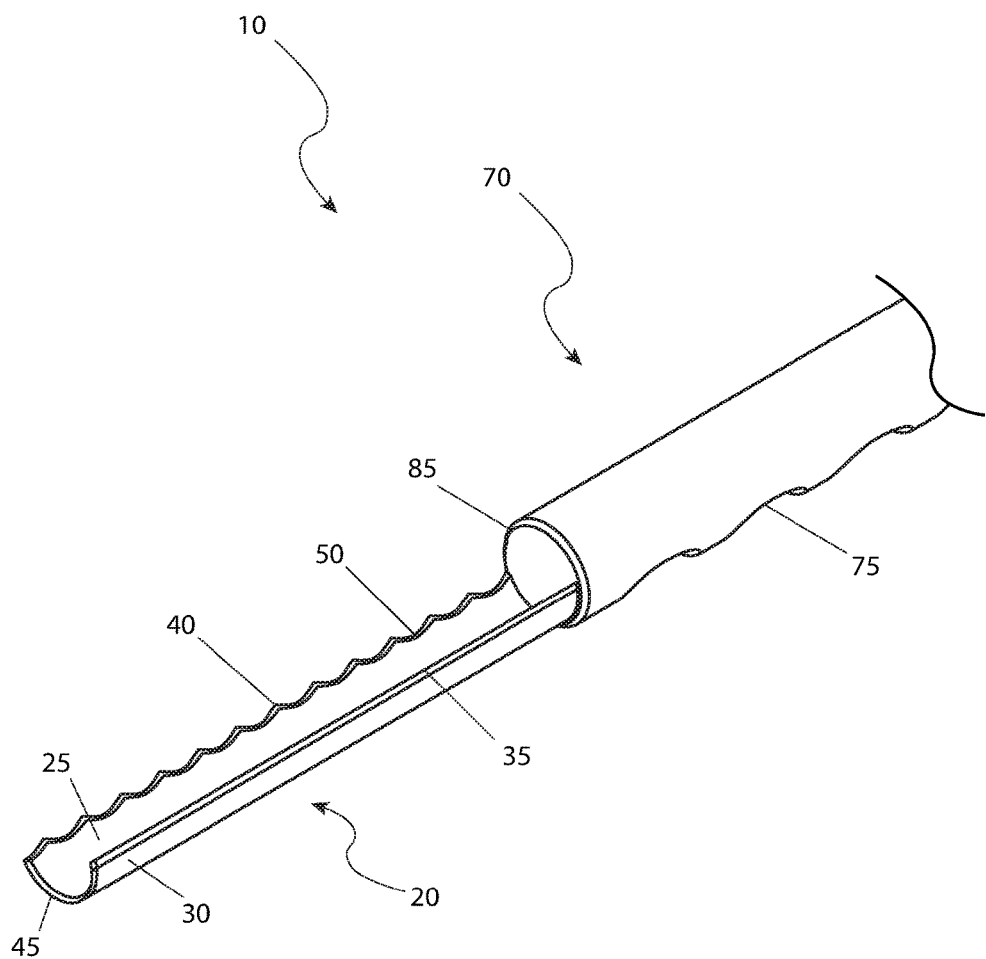
Figure 3:
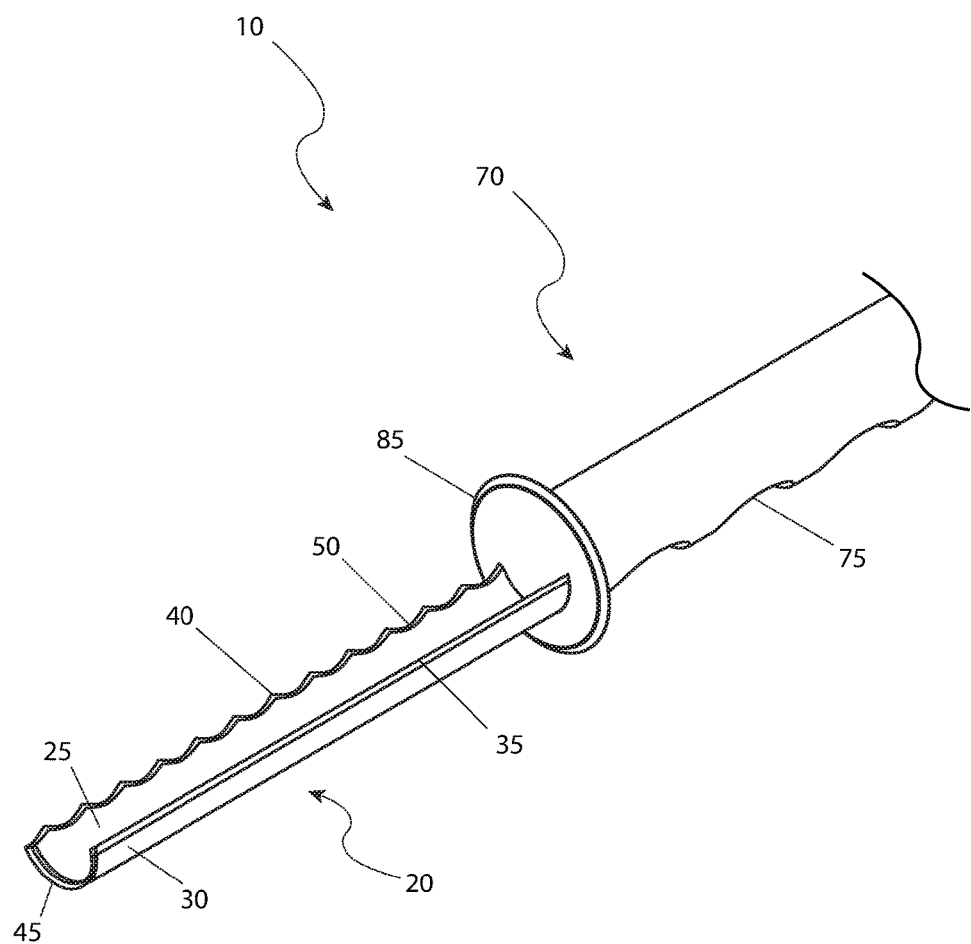
FIG. 3 perspective view of a cutting tool with a curved blade 10 in accordance with an alternate embodiment of the present invention.

Referring now to FIG. 1, an isometric view of the tool 10, and FIG. 2, an isolated view of serrations 50 along a second edge 40 of a blade 20 of the tool 10, according to the preferred embodiment of the present invention, FIG. 3, an isometric view of the tool 10, according to an alternate embodiment are disclosed. The tool 10 includes a blade 20 and a handle 70. The tool 10 is preferably composed of stainless steel having the blade 20 formed with the handle 70, or attached thereto, such as by welding, in a subsequent manufacturing procedure. It is understood that other materials, capable of resisting corrosion, and having the ability to retain a keen edge, may be utilized without limiting the scope of the tool 10. Other embodiments provide for the blade 20 and the handle 70 to comprise different materials, such as the blade 20 being stainless steel and the handle 70 being wood, amongst other combinations.

The blade 20 has an arcuate cross-section, generally "C"-shaped, along the entire length from a distal edge 45 to the handle 70. This particular presentation permits the blade 20 to have an inner face 25 curved upon itself and an outer face 30 oriented away from the blade 20. The distal edge 45 is provided with a taper between the inner face 25 and the outer face 30 so as to present a sharp edge in order for the blade 20 to be more easily inserted into a fruit, or other foodstuff. The blade 20 has a first edge 25 and a second edge 30 oriented in the same direction by virtue of the previously enabled lateral curve inherent in the design of the tool 10. The first edge 25 is preferably provided with a taper from the outer face 30 to the inner face 25 so as to form a straight, sharp crest along that first edge 25 from the distal edge 35 to the handle 70. The second edge 40 is also provided with a taper from the outer face 20 to the inner face 25 from the distal edge 35 to the handle 70. However, the second edge 40 is also ground in a manner to provide a series of trough-like serrations 50, as seen in FIG. 2, meant to reduce the effort required to insert that second edge 40 into the flesh of a fruit, or other foodstuff. It is understood that the serrations 50 may be ground along the first edge 35 of the blade 20 rather than the second edge 40 without limiting the scope, or the intent, of the tool 10.

The handle 70 is generally cylindrical with a grip 75 disposed along one (1) surface to improve the grasp of a user upon the tool 10. The grip 75 is comprised of a series of depressions, with intermittent rises, into which a user's fingers may be disposed to grant that improved grasp. The proximal end of the handle 70 is provided with a hemispherical butt 80 to obviate any discomfort associated with clutching the tool 10, especially when thrusting the distal edge 45 of the blade 20 into a fruit, or another foodstuff. The outside diameter of the handle 70 is larger than the width of the blade 20 in order to provide a guard 85 at the distal end of the handle 70. The guard 85 is intended to prevent a user's hand, or any portion thereof, from becoming wedged between the handle 70 and any foodstuff. It is envisioned that, in some embodiments, the guard 85 may be flared to an even larger diameter than the remainder of the handle 70 in order to prevent the slippage of a user's hand toward the blade 20 (please see FIG. 3).

The preferred embodiment of the present invention can be utilized by an enabled individual in a simple and straight-forward manner with little or no training. After initial purchase or acquisition of the tool 10, it would be constructed as indicated in FIG. 1 or FIG. 3. The method of installing and utilizing the tool 10 may be achieved by performing the following steps: acquiring a model of the tool 10 in a size appropriate to the task; holding the tool 10 by the handle 60 in a hand of preferred usage, with the fingers of that hand encircling the handle 70 and disposed within the depressions of the grip 75; inserting the distal edge 45 of the blade 20 into either the stem end, or the blossom end of the selected fruit, at the preference of the user; aligning the blade 20 along the core of the fruit toward an opposite end thereof; thrusting the blade 20 entirely through the fruit such that the distal edge 45 is forced to exit from the opposite end thereof; exerting a rotational force about a longitudinal axis of the tool 10, in either a clockwise, or a counterclockwise direction; rotating the tool 10 through a minimum arc exceeding one hundred eighty degrees (180°), thereby completely severing the core from any surrounding tissue; and extricating the tool 10 and the severed core from the fruit. The first edge 35, or the second edge 40, may be utilized to peel the skin from the fruit, or perform any subsequent task for the ultimate preparation for use of the fruit as may be selected by a user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A cutting tool, comprising:
   a handle having a first end and a second end, said handle is generally cylindrical with a grip disposed along one surface to improve the grasp upon the cutting tool, the grip is comprised of a series of depressions, with intermittent rises, into which fingers are disposed to that improved grasp;
   a blade projecting outward from said handle second end, said blade having an inner face and an outer face, a proximate end and a distal end, a first edge and a second edge, and an arcuate cross-section, a proximal end of the handle is provided with a hemispherical butt to obviate any discomfort associated with clutching the cutting tool, especially when thrusting the distal edge of the blade; and
   a guard located on said handle second end adjacent to said blade, wherein said second edge further comprises a series of serrations which extend from said guard to said distal end, an outside diameter of the handle is larger than the width of the blade in order to provide the guard at the distal end of the handle, the guard is flared to a larger diameter than the remainder of the handle in order to prevent slippage of a hand toward the blade.

2. The tool of claim 1, wherein said blade further comprises a first taper between said inner face and said outer face of said first edge, said taper terminating in a first sharp edge.

3. The tool of claim 2, wherein said blade further comprises a second taper between said inner face and said outer face of said second edge, said taper terminating in a second sharp edge.

4. The tool of claim 3, wherein said blade further comprises a third taper between said inner face and said outer face of said distal end, said taper terminating in a third sharp edge.

* * * * *